Patented May 3, 1949

2,468,792

UNITED STATES PATENT OFFICE 2,468,792

DRILLING FLUIDS AND METHODS OF USING SAME

Cary R. Wagner, Utica, Ohio, and William N. Axe, Bartlesville, Okla., assignors to Phillips Petroleum Company, a corporation of Delaware No Drawing. Application August 18, 1947, Serial No. 769,313

12 Claims. (Cl. 252—8.5)

This invention relates to aqueous well drilling fluids. In one specific aspect it relates to aqueous well drilling fluids containing an oxidized cellulose which is soluble in relatively dilute alkali (for example 2% aqueous sodium hydroxide) and which does not precipitate in large quantities upon dilution with water. In another specific aspect it relates to a drilling mud additive which will substantially reduce the water loss due to filtration of water from the drilling fluid into porous formations in the walls of the well. In another specific aspect it relates to a drilling mud additive which is effective in reducing and controlling viscosities of well drilling fluids. In another specific aspect this invention relates to various processes for using the above mentioned drilling fluids in drilling wells.

In the art of drilling wells, especially drilling by the rotary method, it is necessary to use a drilling mud, as is well understood in the art. The drilling mud cools the drill bit, lubricates the drill stem, carries the cuttings to the surface of the well, and forms a filter cake on the walls of the well preventing loss of at least any great amount of water from the drilling mud to the natural formations penetrated by the well. In order to perform these important functions properly the drilling mud must have suitable viscosity and other qualities at all times in spite of adverse conditions encountered in drilling the well.

In drilling wells there is a major difficulty caused by natural formations penetrated, if salt is encountered. The salt will cut ordinary drilling mud so that its viscosity is entirely too high, the clay particles are flocculated, and there is grave danger of the drilling pipe twisting in half or of gas cutting of the mud, or of a blowout occurring due to the salt cutting of the mud.

The principal object of our invention is to produce a drilling mud which can be used not only in ordinary formations but which will resist contamination by salt.

This invention is a continuation in part of our copending application (now abandoned) Serial No. 665,897 filed April 29, 1946 for "Drilling fluids and methods of use."

Another object is to provide an improved drilling mud.

Another object is to provide an improved method of drilling.

Another object is to reduce and control the viscosity of a drilling mud.

Another object is to reduce the water loss by filtration of a drilling mud.

Another object is to provide a method of drilling suitable in ordinary formations, and in salt containing formations.

Numerous other objects and advantages of the invention will be apparent to those skilled in the art upon reading the following specification and the accompanying claims.

The term oxycellulose or oxidized cellulose has been used to cover so many types of materials that it is necessary to further define the material employed in the present invention. The oxidized cellulose which constitutes the present invention is a reaction product of cellulose and nitrogen dioxide. By nitrogen dioxide we naturally mean both nitrogen dioxide, $NO_2$, and nitrogen tetroxide, $N_2O_4$, which is the dimer of nitrogen dioxide and which is present in a certain equilibrium proportion during the process. Whether the nitrogen dioxide or the nitrogen tetroxide, or both cause the reaction, is immaterial.

One suitable method of making this oxidized cellulose with nitrogen dioxide is described fully in two articles in the Journal of the American Chemical Society, 64, 121 and 127 (1942). Many of the properties of such oxidized cellulose are described in the above cited articles, but there is no indication therein that such oxidized cellulose would have any value in drilling mud.

This oxidized cellulose preferably has a large carboxyl content which for the purposes of the present invention may vary as to operative range from about 5% to a theoretical maximum of 25.56%, but the preferable range is from 13% to 20% as this range gives better water solubility and better treating effect than 5% and is less expensive than 25% carboxyl content. In these respects, which are largely of an economic nature, perhaps 20% could be called the optimum.

but actually any percentage from 13% to 25.56% is substantially equivalent in actual treating value.

We employ one of the sodium, potassium, lithium, ammonium, magnesium, calcium, or strontium salts of this oxidized cellulose. The barium salt is water insoluble and cannot be used. The lower limit of 5% carboxyl content is the point at which the oxidized cellulose prepared by oxidation with nitrogen dioxide becomes soluble within a reasonable time by stirring in 2% aqueous sodium hydroxide. Oxycellulose having a carboxyl content above 13% dissolves with relative ease in 2% aqueous sodium hydroxide, or in water. Oxidation by nitrogen dioxide, or such similar process, is characterized by retention of fiber structure by the cellulose, the formation of carboxyl groups from the primary hydroxyl groups, and a minimum of degradation compared to the usual oxidation treatment by strong reagents which produces heterogeneous and degraded products.

The upper limit of 25.56% carboxyl content is the theoretical carboxyl content of cellulose oxidized into polyanhydroglucuronic acid which is supposedly cellulose in which all the primary hydroxy groups $CH_2OH$ have been oxidized to carboxyl groups $COOH$. Oxidized celluloses of from 5 to 25.56% carboxyl content are supposed to correspond to copolymers of anhydroglucuronic acid and anhydroglucose units in corresponding ratios. Whether such compounds are actually formed in the oxidation of cellulose by nitrogen dioxide is immaterial to the invention, which invention remains even if the theoretical composition of the oxidized cellulose is erroneous.

Further information will be found in "The formation and properties of oxidized cellulose" by C. C. Unruh and W. O. Kenyon in Textile Research Journal, volume XVI, Number 1, pages 1 to 12 (1946).

In the present invention, we prefer to employ as an additive for reducing the water loss by filtration of the drilling mud a salt selected from the group consisting of sodium, potassium, lithium, ammonium, magnesium, calcium, or strontium salts of oxidized cellulose, which oxidized cellulose is the reaction product of cellulose and nitrogen dioxide, said oxidized cellulose having a carboxyl content of from 13% to 25.56% by weight.

These salts are added in prepared form to the drilling mud, or may be prepared by adding a reactive substance, such as the corresponding hydroxides, acetates, or salts of weaker acids than acetic acid, of sodium, potassium, lithium, ammonium, magnesium, calcium, or strontium, to the oxidized cellulose, which cellulose may be in the form of linters or in any other granular or powdered form. The addition may take place in the well itself, in the mud pit or in any other part of the circulation system. However we prefer to mix the selected one of said reactive substances and the oxidized cellulose in a tank or in an orifice mixer, the reactive substance for example being 2% aqueous sodium hydroxide, or stronger sodium hydroxide, and the mixed materials being added to the drilling fluid which will dilute the mixture and lower the pH. However, the oxidized cellulose may be added by merely scattering the powder over the surface of the fluid and relying on natural or artificial alkalinity of the drilling mud for the formation of the proper salts. In some instances a pure mixture of water and oxidized cellulose may be used as the well drilling fluid, but clay materials and weighting materials are generally added. The clay materials may be added or may come from the formations penetrated.

Suitable viscosity control agents such as phosphates and/or quebracho may be used with the oxidized cellulose in the usual quantities if desired and other mud treating agents may be used after the usual simple tests for compatibility, oxidized cellulose being compatible with practically all mud treating agents known to the prior art.

Any use of an oxidized cellulose soluble in relatively dilute alkaline solutions, which solutions may often then be made as acid as pH 4 before substantial precipitation takes place, and which the oxidized cellulose is intended to be retained as a soluble dispersing agent and water loss reducing agent throughout the entire normal life of the drilling mud, is not to be confused with the use of some other degraded, heterogeneous oxidized cellulose soluble only in 2N (8%) or stronger caustic soda solutions, which is to be precipitated in large quantities as an insoluble plugging agent upon dilution with water. Such materials which are readily precipitable upon dilution with water are too difficult to handle to employ as well drilling fluids. They are too expensive because of loss of precipitated material, and the precipitated material fills the mud pit, causes choking of the drill string and filling of the bore hole in some instances.

Drilling muds containing soluble salts of oxidized cellulose are not subject to injury by salt to any detrimental degree but may still be useful as drilling muds when there is as much in some instances as 51,000 parts per million of sodium chloride in the drilling mud, or more.

Drilling muds containing soluble salts of oxidized cellulose often have low initial gel strength which allows gas bubbles to come out of the drilling mud so rapidly that the drilling mud will not become gas cut. Elimination of gas cutting reduces the chances of blowouts. Such cellulose drilling muds are often characterized by thin filter cake thickness and by small water loss. This is very useful in avoiding loss of water to the formation, as well as the resultant swelling or caving of the formation which occurs with some formations. These muds do not generally ferment or spoil. Numerous other advantages of such cellulose drilling muds will be apparent from a study of the following representative examples which have been selected to show in a minimum of space the advantages of such cellulose drilling muds.

TESTS

The tests of the properties of solutions of such soluble cellulose, and/or drilling muds made from the same were all made with standard drilling mud laboratory equipment.

The measurement of pH were all made with a Leeds and Northrup pH meter. The viscosity measurements were all made with a Stormer viscosimeter 1931 model made by Arthur H. Thomas Company. The mixing of samples was always, for at least 15 minutes, with a Hamilton Beach No. 33 high speed mixer. Sodium chloride content was calculated from a determination of the chloride ions by titration with silver nitrate using a potassium chromate indicator. The filter cake thickness and water losses were all determined with an "A. P. I. low pressure wall building tester filter press" with a pressure of 100 lb. per square inch applied for 30 minutes except where other time limits are given. All temperatures were approximately room temperature. All barrels are 42 U. S. gallon barrels.

EXAMPLES

In order to demonstrate the value of water soluble cellulose in drilling mud in as brief a manner as possible the following experiments are chosen as representative:

EXAMPLE A

5% aqueous solution of oxycellulose sodium salt, oxycellulose potassium salt and oxycellulose lithium salt are prepared by adding the respective alkali metal hydroxide to portions of lot 93-T (an oxidized cellulose with a 20% carboxyl content), and the solution is diluted by the addition of 100 parts of water to 1 part of solution. In such instances perfectly clear solutions will be obtained. The pH is then reduced to 4 by addition of hydrochloric acid and the solutions will remain clear, but at pH values below 4 visible precipitation takes place.

EXAMPLE B

Oxidized cellulose, lot 97B, was identified by the manufacturer as containing 15% carboxyl content by weight and lot 93T as containing 20% carboxyl content.

Weighed portions of each sample were suspended in water and carefully treated with sodium hydroxide until solution was complete. During this operation care was exercised to avoid a marked excess of caustic in order to prove that the oxidized cellulose was soluble in very dilute caustic. Any slight excess of free caustic was carefully neutralized with hydrochloric acid to yield a solution having a pH value of 8, the same as that of the mud being tested. Aliquot portions of the solution were used to give the desired dosage for the individual tests.

The base mud was a laboratory prepared, weighted mud containing bentonite and kaolin in equal proportions. The code designation of this mud is EB-1 and it is so prepared that it may be diluted with a volume of water equal to that originally present in the mud to give a mixture having substantially the properties of the usual untreated drilling mud.

The samples of oxycellulose were tested by treating this EB-1 base mud with measured amounts of solution corresponding to dosages of 1, 2, and 4 pounds of oxycellulose per barrel of mud, stirring for 30 minutes on a fountain type mixer, then testing for viscosity, gel strength, water loss, cake thickness and pH value. EB-1-F means fresh water, O-15-1 means oxycellulose of 15% carboxyl content at an amount equal to 1 pound per barrel. The results are:

TABLE I

*Results of tests oxycellulose, lot 97-B, 15% carboxyl EB-1-F (fresh water mud)*

|  | EB-1-F | EB-1-F-O-15-1 | EB-1-F-O-15-2 | EB-1-F-O-15-4 |
|---|---|---|---|---|
| Treatment, lbs. per bbl | 0 | 1 | 2 | 4 |
| Mud weight, lbs. per gal | 11.4 | 11.4 | 11.4 | 11.4 |
| Viscosity, cps | 37 | 15 | 19 | 28 |
| Initial gel strength, gm | 50 | 18 | 14 | 14 |
| 10 min. gel strength, gm | 100 | 35 | 50 | 16 |
| Water loss, cc.-7½ min | 16 | 8 | 7 | 4.5 |
| Water loss, cc.-30 min | 31.5 | 16 | 13 | 9 |
| Cake thickness, inches | 19/64 | 4/64 | 3/64 | 3/64 |
| pH | 8 | 8 | 8 | 8 |

TABLE II

*Results of tests oxycellulose, batch 93-T, 20% carboxyl EB-1-F (fresh water mud)*

|  | EB-1-F | EB-1-F-O-20-1 | EB-1-F-O-20-2 | EB-1-F-O-20-4 |
|---|---|---|---|---|
| Treatment, lbs. per bbl | 0 | 1 | 2 | 4 |
| Mud weight, lbs. per gal | 11.4 | 11.4 | 11.4 | 11.4 |
| Viscosity, cps | 37 | 10 | 9 | 12 |
| Initial gel strength, gm | 50 | 5 | 3 | 3 |
| 10 min. gel strength, gm | 100 | 12 | 10 | 10 |
| Water loss, cc.-7½ min | 16 | 8 | 8 | 7 |
| Water loss, cc.-30 min | 31.5 | 17 | 17 | 14 |
| Cake thickness, inches | 19/64 | 4/64 | 4/64 | 3/64 |
| pH | 8 | 8 | 8 | 8 |

It will be observed that, under the conditions of testing, oxycellulose is effective in modifying the properties of the particular type of fresh water mud used, especially viscosity and gel strengths. The effect upon water loss results was valuable. On a comparative basis the 20% carboxyl material, lot 93-T, was more effective than was the 15% material from lot 97-B.

Under the conditions of testing, oxycellulose is effective in modifying the properties of drilling mud. The 20% carboxyl material has a greater effect than does the 15% carboxyl product.

EXAMPLE C

As a comparison, the viscosity of water solutions of the sodium salt of these same two oxidized celluloses was tested. In the following table "weight per cent" stands for grams of salt per 100 milliliters of water, and the carboxyl contents identify the cellulose salt added:

TABLE III

| Weight per cent | Viscosity, cps. | |
|---|---|---|
|  | 15% Carboxyl | 20% Carboxyl |
|  | Cps. | Cps. |
| 1 gms | 1.5 | 2.0 |
| 2 gms | 2.0 | 2.5 |
| 3 gms | 4.0 | 3.0 |
| 4 gms | 7.0 | 4.0 |
| 5 gms | 11.0 | 8.0 |

EXAMPLE D

The 20% oxycellulose was further tested on EB-1 fresh water starch mud in which Impermix had been added (Impermix is a common pasted starch sold by Baroid Sales Company). The code employed is EB-1-F which stands for mud containing weighting material, bentonite and kaolin (as used above), the F standing for fresh water. In the columns having -1-5, 5 pounds of Impermix were added per barrel. In the columns further having -O₁, O₂ and O₄, one, two and four pounds of 20% oxycellulose sodium salt has been added. In Tables V and VI the letter S stands for salt as indicated by the chlorides parts per million. In the mud designations at the head of each column, the number following the letter S indicates the pounds of salt per barrel of drilling mud.

TABLE IV

| | Effect of 20% Oxycellulose on EB-1—Fresh Water Starch Mud | | | | |
|---|---|---|---|---|---|
| | EB-1-F | EB-1-F-1-5 | EB-1-F-1-5-O$_1$ | EB-1-F-1-5-O$_2$ | EB-1-F-1-5-O$_4$ |
| Oxycellulose, lbs. per bbl | 0 | 0 | 1 | 2 | 4 |
| Mud weight, lbs. per gal | 11.4 | 11.4 | 11.4 | 11.4 | 11.5 |
| Viscosity, cps | 37 | 67 | 31.5 | 29 | 25 |
| Initial gel strength, gm | 50 | 105 | 22 | 17 | 12 |
| 10 min. gel strength, gm | 100 | 140 | 50 | 30 | 22 |
| Water loss, ml-30 min | 31.5 | 6 | 6 | 7 | 6.5 |
| Cake thickness, inches | 19/64 | 3/64 | 3/64 | 2/64 | 2/64 |
| pH | 8 | 7.3 | 7.3 | 7.4 | 7.3 |

TABLE V

| | Effect of 20% Oxycellulose on EB-1-S-1 Salt Water Mud | | | |
|---|---|---|---|---|
| | EB-1-S-1 | EB-1-S-1-O$_1$ | EB-1-S-1-O$_2$ | EB-1-S-1-O$_4$ |
| Oxycellulose, lbs. per bbl | 0 | 1 | 2 | 4 |
| Mud Weight, lbs. per bbl | 11.5 | 11.5 | 11.5 | 11.6 |
| Viscosity, cps | 38 | 29 | 38 | 51 |
| Initial gel strength, gm | 50 | 45 | 45 | 42 |
| 10 min. gel strength, gm | 90 | 55 | 80 | 85 |
| Water loss, ml.-30 min | 65 | 58 | 47 | 38 |
| Cake thickness, inches | 19/64 | 14/64 | 19/64 | 9/64 |
| pH | 7.3 | 7.3 | 7.3 | 7.3 |
| Chlorides, P. P. M | 32,000 | 32,000 | 32,000 | 32,000 |

TABLE VI

| | Effect of 20% Oxycellulose on EB-1-S-1 Salt Water Starch Mud | | | | |
|---|---|---|---|---|---|
| | EB-1-S-1 | EB-1-S-1-I-5 | I-5-O-1 | I-5-O-2 | I-5-O-4 |
| Oxycellulose, lbs. per bbl | 0 | 0 | 1 | 2 | 4 |
| Viscosity, cps | 38 | 68 | 84 | 56 | 60 |
| Initial gel strength, gm | 50 | 60 | 70 | 50 | 52 |
| 10 min. gel strength, gm | 90 | 140 | 180 | 120 | 100 |
| Water loss, ml.-30 min | 65 | 25 | 15 | 18 | 14 |
| Cake thickness, inches | 19/64 | 19/64 | 5/64 | 9/64 | 9/64 |
| pH | 7.3 | 7.3 | 7.2 | 7.3 | 7.1 |
| Chlorides, P. P. M | 32,000 | 32,000 | 32,000 | 32,000 | 32,000 |

EXAMPLE E

A solution of 4 pounds of oxidized cellulose in water is mixed with greater than the usual maximum proportions of caustic soda, phosphates (commercially sold as "Calgon") and/or quebracho as used in starch drilling mud and no changes are observed. The tests are made with both one and two chemicals added to the solution.

EXAMPLE F

Trial experiments indicated that ammonium, magnesium, calcium and strontium oxycellulose were water soluble and that barium oxycellulose was not water soluble. In view of these results, the first four in the series were prepared by dissolving the oxycellulose (Tenn. Eastman, batch 93-T, 20% COOH.) in saturated solutions of the hydroxides. It was necessary to provide considerable excess of hydroxide in the preparation of both calcium and strontium oxycellulose in order to dissolve the oxycellulose. These solutions were filtered and poured into 1½ volumes of acetone to precipitate the metal oxycellulose. The precipitates were filtered, washed with acetone and air dried.

Barium oxycellulose was prepared by adding a solution of barium hydroxide to a solution of ammonium oxycellulose. The precipitate was filtered, water washed and air dried. All the dried samples were ground to pass a 40 mesh screen.

EXAMPLE G

The following Table VII shows the measured properties of 1% aqueous solutions of the oxycellulose samples. The barium oxycellulose was insoluble, therefore the pH of the supernatant liquid was the only property tested. The concentrations were based on the dry weights of the materials and the solutions stood overnight before being tested. The data tabulated under "ml. gel per 10 ml. solution," represent the amount of insoluble gel collected in the bottom of a centrifuge tube after the solution was centrifuged for five minutes.

Testing of these oxycellulose derivaties in water (Table VII) shows that, with the exception of barium oxycellulose, the derivatives were readily water soluble and they gave solutions of very low viscosity. pH measurements on 1% aqueous solutions show that the ammonium, calcium, and strontium derivaties give an acid reaction while the magnesium and particularly the barium oxycellulose products gave an alkaline reaction. As mentioned previously, the alkalinity of the barium oxycellulose is probably due to the presence of some excess barium hydroxide.

TABLE VII

Properties of 1% aqueous solutions

| Material | Viscosity (cps.) at 20° C. | ml. gel per 10 ml. solution | pH |
|---|---|---|---|
| NH$_4$ Oxycellulose | 1.0 | 0.0 | 5.5 |
| Mg Oxycellulose | 1.0 | 0.0 | 7.2 |
| Ca Oxycellulose | 1.0 | 0.1 | 4.3 |
| Sr Oxycellulose | 1.0 | 0.1 | 4.6 |
| Ba Oxycellulose | | | 9.1 |

EXAMPLE H

The samples were tested in a laboratory-prepared drilling mud designated as low calcium EB-10-F which had the following composition after dilution; ezmex (a native west Texas clay) 8.10%, bentonite 0.80%, BaSO₄ 26.30%, BaSO₃ 0.80% and water 57.00%.

Dosages of the materials tested were made so that 0, 1, 2, 3 and 4 pounds of additive were present per barrel of mud. The required amounts of materials were hydrated in 50 ml. of water, added to 250 ml. of base mud and stirred for 30 min. on a high speed mixer. The treated mud samples were allowed to stand overnight then stirred again for 30 minutes and tested for viscosities, gel strengths and water losses according to the test procedures outlined in A. P. I. code #29. These results are shown in the attached Table VIII.

Inspection of the data in Table VIII shows that all of the derivatives of oxycellulose reduced the viscosity and gel strengths in the mud system tested, the magnesium and barium derivaties being the least effective, particularly in the higher dosages of 3 and 4 pounds of additive per barrel of mud. In comparison the best reduction was obtained with ammonium oxycellulose, 4 pounds of this material effecting a 60% reduction in water loss.

adjustments being made with sodium or ammonium hydroxide. Upon heating these systems, 2 hours at 210° F., only the high pH system containing sodium oxycellulose-sodium hydroxide shows practically no change in properties. Any of the systems containing ammonium, either as ammonium oxycellulose or ammonium hydroxide, have appreciable increases in viscosity, gel strengths, and water loss after heating.

*Amount to be used*

Actually, oxidized cellulose is useful in all reasonable amounts, as it does not have any sudden critical range which would cause loss of a well due to enormous changes in the quality of the mud upon adding a small additional amount of the oxycellulose salt. In adding additives to drilling mud it is common practice to test the drilling mud and observe the results of the added material, and to stop the addition when suitable qualities are obtained. No one wishes to add any more material than needed, because the materials are expensive when the large amount used is considered. Small amounts of oxycellulose used in drilling mud are valuable substantially in proportion to the amount. Therefore, when we state that the quantity of oxycellulose salts to be used should vary from 0.5 to 10 pounds per barrel it is to be understood that these are not in the nature of critical limits, as more or less may be of value. Barium sulfate is a good weighting agent with these oxycellulose drilling muds and can be added in the usual amounts to give the desired weight.

In general, it is desirable to keep the drilling mud within pH ranges of 7 to 13 to obtain best results and to increase the time of useful life of the oxycellulose. However there is substantially no upper pH limit, and Example A above shows that the pH might fall to 4 in the case of the alkali metal salts before trouble was encountered, however we do not advise anyone to allow the pH to approach 4 nor to go above 11 while drilling a well.

The above simple experiments are merely representatives and are given merely to show why

TABLE VIII

*Effect of oxycellulose derivatives on low calcium EB-10-F (Ca=34 U. U. M.)*

| | Viscosity, cps. | | | | | Initial gel, gms. | | | | | 10 minute gel, gms. | | | | | 30 minute water loss, ml. | | | | | pH of Filtrate | | | | |
|---|---|---|---|---|---|---|---|---|---|---|---|---|---|---|---|---|---|---|---|---|---|---|---|---|---|
| Pounds per barrel | 0 | 1 | 2 | 3 | 4 | 0 | 1 | 2 | 3 | 4 | 0 | 1 | 2 | 3 | 4 | 0 | 1 | 2 | 3 | 4 | 0 | 1 | 2 | 3 | 4 |
| NH₄ Oxycellulose | 14 | 6.5 | 6.0 | 8.5 | 8.5 | 20 | 2 | 0 | 0 | 0 | 50 | 10 | 15 | 15 | 15 | 35 | 24 | 19 | 17 | 14 | 9.4 | 8.7 | 8.5 | 8.5 | 8.3 |
| Mg Oxycellulose | 14 | 7.5 | 6.5 | 8.0 | 10.5 | 20 | 5 | 7 | 7 | 10 | 50 | 15 | 15 | 20 | 20 | 35 | 30.5 | 32.5 | 34.5 | 35.5 | 9.4 | 8.8 | 8.3 | 8.3 | 8.3 |
| Ca Oxycellulose | 14 | 4.5 | 5.0 | 6.5 | 6.7 | 20 | 3 | 0 | 0 | 0 | 50 | 10 | 20 | 10 | 10 | 35 | 28 | 27 | 30 | 27 | 9.4 | 8.3 | 8.2 | 8.1 | 7.9 |
| Sr Oxycellulose | 14 | 6.5 | 6.5 | 9.9 | 10.5 | 20 | 3 | 2 | 0 | 0 | 50 | 15 | 15 | 15 | 20 | 35 | 28.5 | 28 | 28.5 | 26.5 | 9.4 | 8.6 | 8.4 | 8.4 | 8.2 |
| Ba Oxycellulose | 14 | 6.5 | 9.5 | 10.0 | 13.5 | 20 | 7 | 8 | 15 | 17 | 50 | 15 | 35 | 25 | 40 | 35 | 31 | 34 | 37 | 43 | 9.4 | 8.8 | 8.7 | 8.7 | 8.7 |

TABLE IX

*The effect of heat on selected samples in low calcium EB-10-F (high pH) before and after being heated to 210° F. for 2 hours*

| | Viscosity, cps. | | Initial gel, gms. | | 10 min. gel, gms. | | 30 min. water loss, ml. | | pH of Filtrates | |
|---|---|---|---|---|---|---|---|---|---|---|
| | Before Heating | After Heating | Before Heating | After Heating | Before Heating | After Heating | Before Heating | After Heating | Before Heating | After Heating |
| EB-10-F+NaOH | Plastic, no tests made | | | | | | | | 12.5 | 11.0 |
| EB-10-F+NH₄OH | 23.5 | 15.0 | 35.0 | 14.0 | 75.0 | 45.0 | 31.0 | 29.0 | 10.6 | 10.5 |
| 4 lbs./bbl. NH₄ oxycellulose+NaOH | 6.5 | 17.5 | 0 | 10.0 | 10 | 35.0 | 16.0 | 25.0 | 11.8 | 02.7 |
| 4 lbs./bbl. NH₄ oxycellulose+NH₄OH | 8.5 | 22.5 | 0 | 13.0 | 15 | 60.0 | 20.0 | 27.5 | 10.3 | 10.1 |
| 4 lbs./bbl. Na oxycellulose+NaOH | 7.5 | 6.5 | 0 | 0 | 15.0 | 15.0 | 15.0 | 19.0 | 11.3 | 12.4 |
| 4 lbs./bbl. Na oxycellulose+NH₄OH | 10.0 | 14.0 | 2 | 10.0 | 35 | 55.0 | 18.0 | 26.0 | 10.6 | 10.2 |

EXAMPLE I

Ammonium oxycellulose equivalent to 4 pounds per barrel was tested in a low calcium EB-10-F mud with the pH raised above 10 with NaOH in one case and with NH₄OH in another case. These samples were tested at room temperature, after standing overnight, and were then heated to 210° F. in an oil bath for 2 hours. After cooling to room temperature, the pH was adjusted as nearly as possible to the value obtained before heating and the samples were again tested. Blank samples and samples containing 4 pounds per barrel of sodium oxycellulose were tested for purpose of comparison. The sodium oxycellulose was prepared by dissolving oxycellulose (batch 93-T) in NaOH solution.

The data in Table IX show that ammonium and sodium oxycellulose still maintain their property of reducing viscosities, gel strengths, and filtration rate in a mud with a high pH, the pH such soluble cellulose containing drilling muds are valuable as drilling muds even where salt contamination is encountered.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, nor from the scope of the invention as defined in the following claims. It is to be understood that the invention is not to be limited to the specific details described. For example, calcium salts may form a white haze of colloidal nature in the solution and the cellulose will still be substantially water soluble. For example, the tests with treating and control agents indicate that water soluble celluloses are somewhat inert chemically and that all the treating and control agents of the well drilling fluid art may, after a simple test for solubility and lack of obvious adverse reaction, be employed without invention in our cellulose drilling fluids, and that with few if any exceptions they will be so employable. Our invention is therefore to be defined by the following claims.

Having described our invention, we claim:

1. In a process of drilling wells comprising the steps of drilling the well with well drilling tools, and circulating through the well during said drilling a water base drilling mud which forms a filter cake on the wall of the well, the improvement comprising incorporating in said drilling mud a water soluble salt selected from the group consisting of sodium, potassium, lithium, ammonium, magnesium, calcium and strontium salts of an oxidized cellulose in an amount sufficient to reduce the water loss due to filtration through said filter cake but insufficient to increase the viscosity of said drilling mud to such an extent that it cannot be circulated, which oxidized cellulose is a reaction product of cellulose and nitrogen dioxide, said oxidized cellulose having a carboxyl content of between 5 and 25.56 per cent by weight.

2. A water base well drilling mud comprising in combination sufficient water to maintain the mud as a fluid, sufficient clayey material to form a filter cake on the wall of the well, and a water soluble salt selected from the group consisting of sodium, potassium, lithium, ammonium, magnesium, calcium and strontium salts of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

3. A water base well drilling mud comprising an aqueous fluid mixture containing suspended solids which form a filter cake on the wall of the well, and a water soluble salt selected from the group consisting of sodium, potassium, and lithium, ammonium, magnesium, calcium and strontium salts of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

4. In a process of drilling wells comprising the steps of drilling the well with well drilling tools, and circulating through the well during said drilling a water base drilling mud which forms a filter cake on the wall of the well, the improvement comprising incorporating in said drilling mud a water soluble sodium salt of an oxidized cellulose in an amount sufficient to reduce the water loss due to filtration through said filter cake but insufficient to increase the viscosity of said drilling mud to such an extent that it cannot be circulated, which oxidized cellulose is a reaction product of cellulose and nitrogen dioxide, said oxidized cellulose having a carboxyl content of between 5 and 25.56 per cent by weight.

5. In a process of drilling wells comprising the steps of drilling the well with well drilling tools, and circulating through the well during said drilling a water base drilling mud which forms a filter cake on the wall of the well, the improvement comprising incorporating in said drilling mud a water soluble ammonium salt of an oxidized cellulose in an amount sufficient to reduce the water loss due to filtration through said filter cake but insufficient to increase the viscosity of said drilling mud to such an extent that it cannot be circulated, which oxidized cellulose is a reaction product of cellulose and nitrogen dioxide, said oxidized cellulose having a carboxyl content of between 5 and 25.56 per cent by weight.

6. In a process of drilling wells comprising the steps of drilling the well with well drilling tools, and circulating through the well during said drilling a water base drilling mud which forms a filter cake on the wall of the well, the improvement comprising incorporating in said drilling mud a water soluble calcium salt of an oxidized cellulose in an amount sufficient to reduce the water loss due to filtration through said filter cake but insufficient to increase the viscosity of said drilling mud to such an extent that it cannot be circulated, which oxidized cellulose is a reaction product of cellulose and nitrogen dioxide, said oxidized cellulose having a carboxyl content of between 5 and 25.56 per cent by weight.

7. A water base well drilling mud comprising in combination sufficient water to maintain the mud as a fluid, sufficient clayey material to form a filter cake on the wall of the well, and a water soluble sodium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

8. A water base well drilling mud comprising in combination sufficient water to maintain the mud as a fluid, sufficient clayey material to form a filter cake on the wall of the well, and a water soluble ammonium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

9. A water base well drilling mud comprising in combination sufficient water to maintain the mud as a fluid, sufficient clayey material to form a filter cake on the wall of the well, and a water soluble calcium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

10. A water base well drilling mud comprising an aqueous fluid mixture containing suspended solids which form a filter cake on the wall of the well, and a water soluble sodium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

11. A water base well drilling mud comprising an aqueous fluid mixture containing suspended solids which form a filter cake on the wall of the well, and a water soluble ammonium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

12. A water base well drilling mud comprising an aqueous fluid mixture containing suspended solids which form a filter cake on the wall of the well, and a water soluble calcium salt of an oxidized cellulose in an amount sufficient to reduce the water loss due to filtration through said filter cake without increasing the viscosity of said well drilling mud to such an extent that it cannot be circulated, which oxidized cellulose is a reaction product of cellulose and nitrogen dioxide, said oxidized cellulose having a carboxyl content of between 5 and 25.56 per cent by weight.

CARY R. WAGNER.
WILLIAM N. AXE.

REFERENCES CITED

The following references are of record in the file of this patent:

UNITED STATES PATENTS

| Number | Name | Date |
|---|---|---|
| 2,129,913 | Cross et al. | Sept. 13, 1938 |
| 2,232,990 | Yackel et al. | Feb. 25, 1941 |
| 2,256,391 | Hiatt | Sept. 16, 1941 |
| 2,337,296 | Kennedy et al. | Dec. 21, 1943 |
| 2,364,434 | Foster | Dec. 5, 1944 |
| 2,399,986 | Chapman | May 7, 1946 |
| 2,425,768 | Wagner | Aug. 19, 1947 |

Certificate of Correction

May 3, 1949.

Patent No. 2,468,792.

CARY R. WAGNER ET AL.

It is hereby certified that errors appear in the printed specification of the above numbered patent requiring correction as follows:

Columns 7 and 8, Table IV, fourth column, in the heading thereto, for "EB-1-F 1-5-0₁" read "EB-1-F-1-5-0₁"; same table, fifth and sixth columns, in the heading in each instance for that portion reading "1-5-" read *I-5-*; column 7, line 66, for "hydrovides" read *hydroxides*; column 9, line 2, for "BaSO₃" read *BaCO₃*; columns 9 and 10, Table VIII, right-hand portion of the heading, for "(Ca=34 U. U. M.)" read *(Ca=34 p. p. m.)*; and that the said Letters Patent should be read with these corrections therein that the same may conform to the record of the case in the Patent Office.

Signed and sealed this 1st day of November, A. D. 1949.

[SEAL]

THOMAS F. MURPHY,
*Assistant Commissioner of Patents.*